United States Patent [19]

Mahn, Sr. et al.

[11] Patent Number: 4,971,644

[45] Date of Patent: Nov. 20, 1990

[54] REVERSE METHOD OF APPLYING HEAT ACTIVATED ORNAMENTAL TRANSFER

[75] Inventors: John Mahn, Sr., 10455 Deer Trail, Harrison, Ohio 45030; John Mahn, Jr., Cincinnati, Ohio

[73] Assignee: John Mahn, Sr., Cincinnati, Ohio

[21] Appl. No.: 448,743

[22] Filed: Dec. 11, 1989

[51] Int. Cl.$^5$ ........................ B32B 31/00; B32B 31/20

[52] U.S. Cl. .................................... 156/253; 156/267; 156/309.6; 156/293; 428/139

[58] Field of Search ............ 156/253, 267, 293, 309.6, 156/323; 428/139

[56] References Cited

U.S. PATENT DOCUMENTS

| | | | |
|---|---|---|---|
| 3,660,212 | 5/1972 | Liebe, Jr. . | |
| 4,066,802 | 1/1978 | Clemens | 156/230 |
| 4,269,885 | 5/1981 | Mahn | 428/216 |
| 4,390,387 | 6/1983 | Mahn . | |
| 4,610,904 | 9/1986 | Mahn, Sr. et al. . | |
| 4,786,349 | 11/1988 | Mahn, Sr. | 156/234 |
| 4,842,908 | 6/1989 | Cohen et al. | 428/194 |

*Primary Examiner*—Michael W. Ball
*Assistant Examiner*—Chester T. Barry
*Attorney, Agent, or Firm*—Wood, Herron & Evans

[57] ABSTRACT

A method of applying a heat activated ornamental transfer to a foraminous substrate such as a mesh shirt employs an absorbent layer to absorb portions of the transfer which cover holes in the foraminous surface. The heat activated transfer is positioned on the substrate with an absorbent material underneath the substrate. Heat and pressure is applied to the heat activated transfer causing it to bond to the foraminous substrate. This same heat and pressure also causes that portion of the transfer covering holes to bond to the absorbent material beneath the substrate. While still warm, the absorbent material is separated from the material pulling with it the portions of the transfer which cover holes. This leaves the holes clear providing an extremely pleasant aesthetic appearance.

3 Claims, 1 Drawing Sheet

REVERSE METHOD OF APPLYING HEAT ACTIVATED ORNAMENTAL TRANSFER

BACKGROUND OF THE INVENTION

Ornamental transfers and indicia presenting heat activated decoratives are well known and are typically applied to cloth of all types. These decoratives, particularly heat activated decoratives, are used to provide numbers on sports jerseys, names on shirts and company logos on uniforms.

There are several types of heat activated decoratives. These have a heat activated adhesive layer which bonds to a cloth substrate. A second, upper layer can be formed of a variety of different materials including thermoplastics, thermosets, flock, and plastisols. In other applications, thread in the form of an embroidered letter can be the upper layer with a thermoplastic adhesive layer on the bottom. These are all applied to a substrate by heat, pressure and time sufficient to activate or melt the adhesive layer and permit penetration of the adhesive into the surface of a garment. Some decoratives are formed from thermosetting resins which can be cured as they are applied to the substrate.

There are many different types of transfers disclosed in the literature. For example, Liebe U.S. Pat. No. 3,660,212, discloses a heat seal formed of a polyvinyl chloride lower layer and a surface layer of a cross-linked polyvinyl chloride plastisol. The plastisol is highly pigmented and it acts as an ink.

Another decorative is disclosed in Mahn U.S. Pat. No. 4,390,387. This patent discloses a flocked decorative with a lower thermoplastic layer. Further, Mahn U.S. Pat. No. 4,610,904, discloses a heat activated removable ornamental heat seal which includes a lower thermoplastic layer and an upper continuous layer of a thermoset material. The upper layer is preferably a thermoset ink. This upper layer, as disclosed in this patent, is a continuous layer which stands between the heat source and the thermoplastic layer. A silicone coated sheet can be placed between the heat source and the thermoset layer.

These transfers and heat seals are applied to a variety of different types of substrates. For example, the substrate can be fabric formed from polyester, nylon, cotton, rayon and so on.

Sports jerseys, in particular, are frequently made from a mesh or foraminous fabric. These mesh fabrics have regularly spaced holes throughout the surface of the fabric to facilitate air flow. The holes can vary in size from a millimeter to 15 to 20 millimeters.

Since these are sports jerseys, it is desirable to have a number attached to the sports jersey. In the past, when a heat activated transfer was applied to these jerseys, the holes were typically covered over with the transfer. This is aesthetically unappealing and further blocks air flow through the jersey.

These jerseys can be screen printed but this is extremely limiting. It is totally unsuitable for applying different transfers to personalize a jersey, i.e., with a name or number.

SUMMARY OF THE INVENTION

Accordingly, it is an object of the present invention to provide a method for applying a heat activated transfer to a fabric or substrate which has a plurality of holes wherein the transfer is applied in a manner such that the holes are not blocked or covered over.

Further, it is an object of the present invention to accomplish this while employing a continuous heat activated transfer which initially covers or blocks the holes, but upon completion of the application, does not block the holes in the substrate.

Further, it is an object of the present invention to use an absorbent layer underneath the cloth substrate to bond to the portions of the heat activated transfer which cover the holes of the substrate so that upon completion of the heating of the transfer, the absorbent material can be removed, pulling with it only the portions of the heat activated transfer that previously covered the holes while at the same time ensuring that the edges of the holes are coated so that this cloth around the holes is not exposed. By using this method not only are the holes left opened, but the method acts to coat the edges of the holes with the substrate. This provides an aesthetic appearance that is even superior to screen printing. At the same time, it provides a method to personalize a single jersey at very reasonable cost.

The objects and advantages of the present invention will be further appreciated in light of the following detailed description and drawings in which.

DETAILED DESCRIPTION

Figure 1:
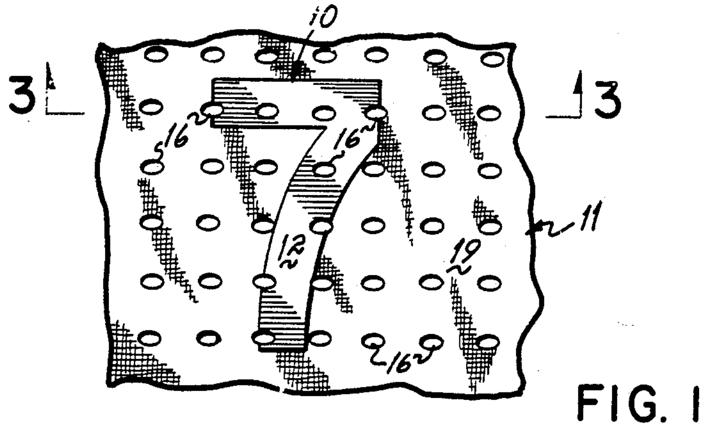
FIG. 1 is a plan view showing a heat activated indicia bearing transfer (7) applied to a foraminous substrate according to the present invention.

According to the present invention, a heat activated transfer 10 is adhered to a foraminous or mesh substrate 11. The heat activated transfer 10 typically includes an upper indicia bearing layer 12 and a lower heat activated adhesive layer 14. This is applied to the cloth 11 which has a plurality of holes 16.

The application method, which will be described further below, uses an absorbent substrate 17 located beneath the cloth layer 11 to absorb and retain those portions 18 of the heat activated transfer 10 which lie above holes 16.

The methods of forming these heat activated transfers are well known. The upper indicia bearing layer 12 is formed from different heat resistant materials which are not destroyed at application temperatures. Preferably the upper layer is a thermoplastic polymeric material or flock. Further, thermoset materials which are softened at application temperatures may also be used.

The upper indicia layer may be, for example, vinyl plastisol such as disclosed in Liebe, Jr. U.S. Pat. No. 3,660,212 or a flock material such as disclosed in Mahn U.S. Pat. No. 4,390,387 or a thermoplastic urethane as is disclosed in Mahn U.S. Pat. No. 4,269,885. If a thermoset material is used as the upper indicia layer 12, it must be one which given its thickness and tensile strength can be separated or broken at application conditions as described below.

One particular material particularly suited for the present invention are puffed inks such as the Will-Flex brand plastisol screen ink made by Flexible Products Company. Other puff inks are known and available for purchase.

One indicia bearing layer which is unsuitable for use in the present invention is a cloth or woven indicia bearing layer such as twill or the like. However, other similar materials such as flock can be employed in the present invention since this is not a continuous woven layer.

The lower layer 14 is a heat activated adhesive layer. Suitable thermoplastic adhesives include polyester adhesives such as Emhart polyester thermoplastic adhesive, polyurethane adhesives such as K. J. Quinlan Company PS-27; as well as mixtures of polyester and polyurethane thermoplastic adhesives. Polyamide adhesives can also be employed as well as acrylic cross-linking adhesives such as Rhom and Haas, Rhoplex LE1126 or Rhoplex K87. Such adhesives are disclosed in U.S. Pat Nos. 4,390,387, 4,269,885, 4,610,904 and 4,786,349.

A particularly useful adhesive for bonding onto nylon substrates is disclosed in Mahn U.S. Pat. No. Application 218,709, filed July 13, 1988. This adhesive is a thermosetting polyester. Specifically it is a linear saturated polyester polymer which includes a heat activated curing agent. Generally the polyester is a linear alkyl saturated polyester formed by reacting a glycol with a diacid. The molecular weight of the uncured polyester polymer should be low enough to flow and wet the surface of the nylon at application temperature, i.e., generally about less than 450° F. Preferably the molecular weight should be 5,000 to 30,000 and preferably 10,000 to 15,000. The polyester adhesive should include a heat activated curing agent and preferably a heat activated polyisocyanate curing agent.

One adhesive that is particularly useful for the present invention is Bostic 10300-3. This can be bonded to an upper indicia layer as a film or can be ground and applied as a powder to a indicia bearing layer during manufacture. For example, if the upper layer is a polyvinyl chloride plastisol puff ink, the transfer can be formed by screen printing the plastisol ink onto a release surface and covering the wet ink with a coating of ground adhesive particles (Bostic 10-300-3). When the ink dries, it forms a heat activated transfer suitable for use in the present invention.

To apply the heat activated transfer 10 to the foraminous cloth substrate 11, the lower adhesive layer 14 of transfer 10 is placed against the upper surface 19 of substrate 11. As can be seen from FIGS. 1 and 2, the transfer 10 covers a plurality of the holes 16 which extend through the substrate 11.

Figure 2:
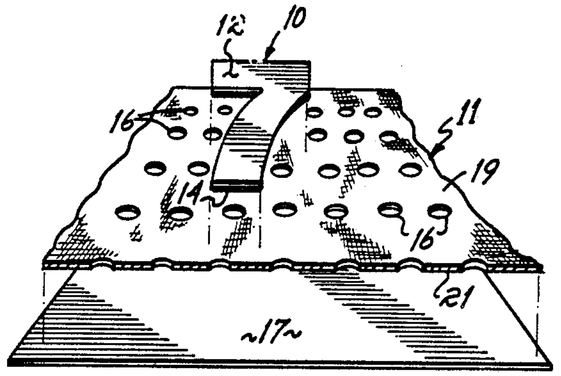
FIG. 2 is a perspective view broken away and exploded showing the application of an indicia (7) to a substrate.
Figure 3:
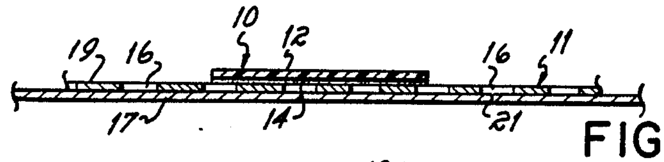
FIG. 3 is a cross sectional view taken at lines 3—3 of FIG. 1 prior to the application of heat.

As shown in FIG. 2, the lower surface 21 of substrate 11 is placed against the sheet of absorbing material 17. The absorbing material is one which the adhesive layer 14 will adhere to during application of the heat activated transfer to the substrate 11. Preferably it is a disposable material such as a cellulose or wood fiber based paper. Particularly suitable for this is a paper towel such as one-ply crepe toweling paper from Kimberly-Clarke also Scott Microwipes brand cellulose fiber paper can be used. Also suitable would be cloth such as a cotton cloth. Basically, it simply must be a material which is compatible with the heat activated adhesive.

Figure 4:
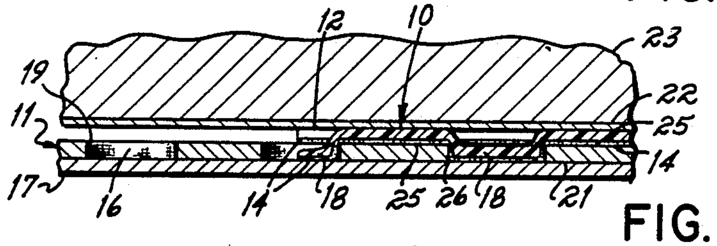
FIG. 4 is a cross sectional view taken at lines 3—3 of FIG. 1 during the application of heat.

With the heat activated transfer resting on the substrate 11 which in turn is resting on the absorbent material 17, heat and pressure is applied to to bond the transfer to the substrate. A protective or silicon coated release layer 22 may be employed separating the heating surface or iron 23 from the heat activated transfer 10 as shown in FIG. 4.

The amount of heat and time required to apply a particular heat activated transfer will vary again depending on the heat activated adhesive used or heat transfer. The heat and pressures applied for a time sufficient to bond the heat activated adhesive to the cloth substrate. The pressure which is applied against the substrate also bonds the portions 18 of the heat activated transfer which lie above or cover holes 16 to the absorbent material 17.

Figure 5:
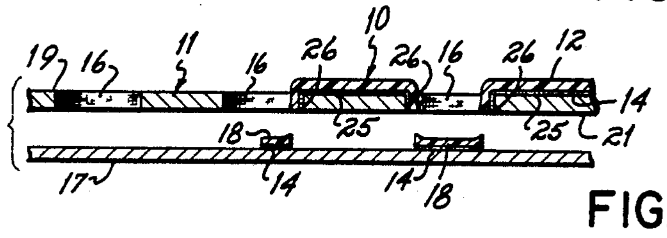
FIG. 5 is a cross sectional view taken along lines 3—3 of FIG. 1 exploded to show removal of the absorbent material from the substrate.

While the heat activated transfer 10 is still hot and its upper surface still very flexible or even fluid, the lower absorbant material 17 is separated from the substrate 11 (see FIG. 5). The absorbent material then pulls with it those portions 18 of the heat activated transfer 10 which were covering holes 16. This leaves behind portions of the heat activated transfer which were covering the field portion 25 of the cloth substrate 11. Further, the edges 26 of the holes 16 are covered by the transfer material.

When used, the adhesive must be suitable for bonding to the particular substrate. When bonding to polyesters, many adhesives are suitable such as polyester, polyurethane and polyamides. Many of the mesh jerseys now manufactured are formed from nylon. When nylon is employed a linear saturated polyester adhesive, specifically Bostic 10-300-3, is preferred.

This method provides for an extremely quick and simple method to bond heat activated transfers to a mesh jersey and provides a very high quality aesthetic appearance. The heat activated transfers completely coats the field portion of the jersey and surrounds the edges of the holes so that none of the jersey is exposed through the transfer. However, the holes are not. Since heat activated transfers are preformed, this method provides a low cost method to apply personalized indicia onto sports jerseys and the like. This provides a low cost, high quality method of personalizing much cloth.

The preceding has been a description of the present invention along with the preferred method of practicing the invention currently known. However, the invention should only be defined by the appended claims wherein, we claim.

1. A method of applying a heat activated ornamental transfer to a planar substrate having a plurality of holes said substrate having upper and lower surfaces and said transfer having a lower layer comprising a heat activated adhesive and an upper indicia bearing layer said method comprising positioning an absorbent sheet under said substrate and in contact with the lower surface of the substrate;

positioning said transfer above said substrate covering a plurality of said holes with said heat activated adhesive layer resting on the upper layer of said substrate directly above said absorbent material;

applying heat and pressure against said transfer compressing said transfer, said substrate and said absorbent together and bonding a first portion of said transfer to said substrate and a second portion of said transfer to said absorbent layer, wherein said first and second portion both include a heat activated adhesive layer and an indicia bearing layer, separating the absorbing material from the substrate whereby said second portions of said transfer remain adhered to said absorbent layer and separate from said transfer leaving said holes unblocked.

2. The method claimed in claim 1 wherein said substrate is nylon and said indicia bearing layer is selected from the group consisting of thermoplastic polymeric materials, vinyl plastisols and flock.

3. The method claimed in claim 1 wherein said substrate is nylon and said heat activated adhesive layer comprises a linear saturated polyester thermosetting adhesive.

* * * * *